US 6,546,391 B1

(12) United States Patent
Tsuruoka

(10) Patent No.: US 6,546,391 B1
(45) Date of Patent: Apr. 8, 2003

(54) HIGH-SPEED LOOKUP METHOD AND HIGH-SPEED LOOKUP APPARATUS

(75) Inventor: Tetsumei Tsuruoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/468,142

(22) Filed: Dec. 21, 1999

(30) Foreign Application Priority Data

Dec. 25, 1998 (JP) ............................................. 10-369960

(51) Int. Cl.$^7$ ................................................. G06F 17/30
(52) U.S. Cl. ................................... 707/8; 707/5; 707/6
(58) Field of Search ............................. 707/5, 6, 8, 100

(56) References Cited

U.S. PATENT DOCUMENTS

| 4,606,002 | A | | 8/1986 | Waisman et al. | |
|---|---|---|---|---|---|
| 5,386,413 | A | * | 1/1995 | McAuley et al. | 370/54 |
| 5,414,704 | A | * | 5/1995 | Spinney | 370/60 |
| 6,018,524 | A | * | 1/2000 | Turner et al. | 707/2 |
| 6,052,683 | A | * | 4/2000 | Irwin | 707/8 |
| 6,067,574 | A | * | 5/2000 | Tzeng | 709/247 |
| 2001/0043602 | A1 | * | 11/2001 | Brown | 370/392 |
| 2001/0056417 | A1 | * | 12/2001 | Cao et al. | 707/3 |

FOREIGN PATENT DOCUMENTS

| JP | 10-49432 | 2/1998 |
|---|---|---|
| JP | 10-112728 | 4/1998 |

* cited by examiner

*Primary Examiner*—Safet Metjahic
*Assistant Examiner*—Camlinh Nguyen
(74) *Attorney, Agent, or Firm*—Katten Muchin Zavis Rosenman

(57) ABSTRACT

Entries which become lookup objects and have variable length comparison conditions are divided into a plurality of groups, a representative lookup key is taken as lookup data for each group, and mask data that sets a range for matching with a match candidate, as well as comparison object data, is stored in masked lookup memory so that setting can be made for each of the entries. Information corresponding to the groups that match the lookup conditions is obtained from the masked lookup memory, and the lookup object entries are limited to the data within the object group. Further, the entries, which become lookup objects, are classified into a tree state, with nodes adopted at points where bit values are either "0" or "1", in order from the first bit, and lookup for matching entry is performed after the entries are limited to the data within the object groups.

14 Claims, 12 Drawing Sheets

FIG.3

3 ROUTING TABLE

| DESTINATION NETWORK ADDRESS | PREFIX LENGTH | OUTGOING INTERFACE | DESTINATION LAYER 2 ADD. |
|---|---|---|---|
| 10.22.66.64 | 26 | #1 | 8:0:20:19:72:7 |
| 10.22.64.0 | 23 | #1 | 8:0:20:19:72:7 |
| 10.21.0.0 | 16 | #1 | 8:0:20:19:72:7 |
| 10.22.66.0 | 26 | #1 | (Incomplete) |
| 10.22.66.1 | 32 | #1 | 8:0:20:19:72:7 |
| 10.22.66.2 | 32 | #1 | 8:0:20:19:72:4 |
| 10.22.66.3 | 32 | #1 | 8:0:20:19:77:22 |
| 10.22.66.4 | 32 | local | N. A. |
| 192.168.1.0 | 24 | #0 | 8:0:20:19:20:7 |
| 192.168.2.0 | 24 | #0 | 8:0:20:89:70:20 |
| 192.168.3.0 | 24 | #0 | (Incomplete) |
| 192.168.3.1 | 32 | #0 | 8:0:20:19:20:7 |
| 192.168.3.2 | 32 | #0 | 8:0:20:89:70:20 |
| 192.168.3.3 | 32 | local | N. A. |
| 192.168.39.0 | 24 | #2 | 0:80:f1:0:59:66 |
| 192.168.40.0 | 24 | #2 | 0:80:f1:0:59:73 |
| 192.168.41.0 | 24 | #2 | 0:80:17:88:82:41 |
| 192.168.42.0 | 24 | #2 | 8:0:20:89:f:33 |
| 192.168.63.0 | 24 | #2 | (Incomplete) |
| 192.168.63.39 | 32 | #2 | 0:80:f1:0:59:66 |
| 192.168.63.40 | 32 | #2 | 0:80:f1:0:59:73 |
| 192.168.63.41 | 32 | #2 | 0:80:17:88:82:41 |
| 192.168.63.42 | 32 | #2 | 8:0:20:89:f:33 |
| 192.168.63.63 | 32 | local | N. A. |
| 192.168.63.114 | 32 | #2 | 0:0:e:34:57:5e |
| 192.168.63.115 | 32 | #2 | 0:0:c0:a1:a:9f |
| 192.168.114.0 | 24 | #2 | 0:0:e:34:57:5e |
| 192.168.115.0 | 24 | #2 | 0:0:c0:a1:a:9f |

FIG.4

| IP ADDRESS | MAC ADDRESS |
|---|---|
| 10.22.66.1 | 8:0:20:19:72:7 |
| 10.22.66.2 | 8:0:20:19:72:4 |
| 10.22.66.3 | 8:0:20:19:77:22 |
| 192.168.3.1 | 8:0:20:19:20:7 |
| 192.168.3.2 | 8:0:20:89:70:20 |
| 192.168.63.39 | 0:80:f1:0:59:66 |
| 192.168.63.40 | 0:80:f1:0:59:73 |
| 192.168.63.41 | 0:80:17:88:82:41 |
| 192.168.63.42 | 8:0:20:89:f:33 |
| 192.168.63.114 | 0:0:e:34:57:5e |
| 192.168.63.115 | 0:0:c0:a1:a:9f |

221 MASKED LOOKUP MEMORY

| LOOKUP KEY | | CORRESPONDING INFORMATION |
|---|---|---|
| DESTINATION NETWORK ADDRESS | MASK VALUE | CORRESPONDING NODE ENTRY |
| 10.22.66.0 | 26 | Virtual entry # 2 |
| 192.168.63.0 | 24 | Virtual entry # 5 |
| 192.168.2.0 | 23 | Virtual entry # 4 |
| 192.168.32.0 | 19 | Virtual entry # 3 |
| 0.0.0.0 | 0 | Virtual entry # 1 |

FIG.10

223 MASKED LOOKUP MEMORY

| LOOKUP KEY | | CORRESPONDING INFORMATION | | |
|---|---|---|---|---|
| DESTINATION NETWORK ADDRESS | MASK VALUE | CORRESPONDING TABLE | LEAST SIGNIFICANT BIT | TABLE LENGTH |
| 10.22.66.0 | 0xFFFFFF80 | (C) | bit0 | 128 |
| 192.168.3.0 | 0xFFFFFF00 | (b) | bit0 | 256 |
| 192.168.63.0 | 0xFFFFFF00 | (a) | bit0 | 256 |
| 10.22.64.0 | 0xFFFFFE00 | (f) | — | 1 |
| 192.168.0.0 | 0xFFFF8000 | (d) | bit8 | 128 |
| 10.21.0.0 | 0xFFFF0000 | (e) | — | 1 |

FIG.11

224 MEMORY TABLE

TABLE(a)

| ENTRY OFFSET | MEMORY CONTENTS | | REMARKS |
|---|---|---|---|
| | OUTGOING INTERFACE | DESTINATION L2 ADD. | DESTINATION NETWORK ADDRESS |
| 0 | #2 | (Incomplete) | 192.168.63.0/32 |
| 1 | #2 | (Incomplete) | 192.168.63.1/32 |
| : | : | : | : |
| 39 | #2 | 0:80:f1:0:59:66 | 192.168.63.39/32 |
| 40 | #2 | 0:80:f1:0:59:73 | 192.168.63.40/32 |
| 41 | #2 | 0:80:17:88:82:41 | 192.168.63.41/32 |
| 42 | #2 | 8:0:20:89:f:33 | 192.168.63.42/32 |
| : | : | : | : |
| 63 | local | N.A. | 192.168.63.63/32 |
| : | : | : | : |
| 114 | #2 | 0:0:e:34:57:5e | 192.168.63.114/32 |
| 115 | #2 | 0:0:c0:a1:a:9f | 192.168.63.115/32 |
| : | : | : | : |
| 255 | #2 | FF:FF:FF:FF:FF:FF | 192.168.63.255/32 |

TABLE(b)

| ENTRY OFFSET | MEMORY CONTENTS | | REMARKS |
|---|---|---|---|
| | OUTGOING INTERFACE | DESTINATION L2 ADD. | DESTINATION NETWORK ADDRESS |
| 0 | #0 | (Incomplete) | 192.168.3.0/32 |
| 1 | #0 | 8:0:20:19:20:7 | 192.168.3.1/32 |
| 2 | #0 | 8:0:20:89:70:20 | 192.168.3.2/32 |
| 3 | local | N.A. | 192.168.3.3/32 |
| 4 | #0 | (Incomplete) | 192.168.3.4/32 |
| : | : | : | : |
| 255 | #0 | FF:FF:FF:FF:FF:FF | 192.168.3.255/32 |

TABLE(c)

| ENTRY OFFSET | MEMORY CONTENTS | | REMARKS |
|---|---|---|---|
| | OUTGOING INTERFACE | DESTINATION L2 ADD. | DESTINATION NETWORK ADDRESS |
| 0 | #1 | (Incomplete) | 10.22.66.0/32 |
| 1 | #1 | 8:0:20:19:72:7 | 10.22.66.1/32 |
| 2 | #1 | 8:0:20:19:72:4 | 10.22.66.2/32 |
| 3 | #1 | 8:0:20:19:77:22 | 10.22.66.3/32 |
| 4 | local | N.A. | 10.22.66.4/32 |
| 5 | #1 | (Incomplete) | 10.22.66.5/32 |
| : | : | : | : |
| 63 | #1 | FF:FF:FF:FF:FF:FF | 10.22.66.63/32 |
| 64 | #1 | 8:0:20:19:72:7 | 10.22.66.63/26 (one part) |
| : | : | : | : |
| 127 | #1 | 8:0:20:19:72:7 | 10.22.66.63/26 (one part) |

FIG.12

TABLE(d)     224 MEMORY TABLE

| ENTRY OFFSET | MEMORY CONTENTS | | REMARKS |
| --- | --- | --- | --- |
| | OUTGOING INTERFACE | DESTINATION L2 ADD. | DESTINATION NETWORK ADDRESS |
| 0 | N. A. | N. A. | No routing information |
| 1 | #0 | 8:0:20:19:20:7 | 192.168.1.0/24 |
| 2 | #0 | 8:0:20:89:70:20 | 192.168.2.0/24 |
| 3 | N. A. | N. A. | No routing information |
| : | : | : | : |
| 38 | N. A. | N. A. | No routing information |
| 39 | #2 | 0:80:f1:0:59:66 | 192.168.39.0/24 |
| 40 | #2 | 0:80:f1:0:59:73 | 192.168.40.0/24 |
| 41 | #2 | 0:80:17:88:82:41 | 192.168.41.0/24 |
| 42 | #2 | 8:0:20:89:f:33 | 192.168.42.0/24 |
| 43 | N. A. | N. A. | No routing information |
| : | : | : | : |
| 62 | N. A. | N. A. | No routing information |
| 63 | #2 | (Incomplete) | 192.168.63.0/24 |
| 64 | N. A. | N. A. | No routing information |
| : | : | : | : |
| 113 | N. A. | N. A. | No routing information |
| 114 | #2 | 0:0:e:34:57:5e | 192.168.114.0/24 |
| 115 | #2 | 0:0:c0:a1:a:9f | 192.168.115.0/24 |
| 116 | N. A. | N. A. | No routing information |
| : | : | : | : |
| 127 | N. A. | N. A. | No routing information |

TABLE(e)

| ENTRY OFFSET | MEMORY CONTENTS | | REMARKS |
| --- | --- | --- | --- |
| | OUTGOING INTERFACE | DESTINATION L2 ADD. | DESTINATION NETWORK ADDRESS |
| 0 | #1 | 8:0:20:19:72:7 | 10.21.0.0/16 |

TABLE(f)

| ENTRY OFFSET | MEMORY CONTENTS | | REMARKS |
| --- | --- | --- | --- |
| | OUTGOING INTERFACE | DESTINATION L2 ADD. | DESTINATION NETWORK ADDRESS |
| 0 | #1 | 8:0:20:19:72:7 | 10.22.64.0/23 |

HIGH-SPEED LOOKUP METHOD AND HIGH-SPEED LOOKUP APPARATUS

BACKGROUND OF THE INVENTION

The present invention relates to a high-speed lookup apparatus as well as a high-speed lookup method for retrieving data at high-speed from a table in which it is stored, matching data provided.

In recent years there has been a rapid increase in the application of networks which use Internet Protocols (IP) as their network layer protocols, to the Internet and to enterprise networks. In accordance with this increase, there is a demand for more high performance in the IP routers which carry out the relaying processing on packets in the IP network. However, the relaying processing of IP packets is performed based on routing information, which manages relaying route selection for the packets in network address (network prefix) units. This network address uses one part of the IP address. That "one part" is an address value defined, for example, with a variable length from the upper part of an address, and the length (prefix length) takes different values depending upon the network address (network prefix). Namely, the field, which is used to represent a network and is a part of an address showing destination for each packet varies according to network addresses. Therefore, if a certain packet is to be relayed, in order to obtain the information corresponding to the network address (network prefix) from the destination address of the packet, it is necessary to perform a comparison process using data lengths that differ for each route entry when referencing the management table. Consequently, to make relay processing of IP packets high-speed, it is necessary to perform a high-speed lookup of the routing information holding this variable length prefix.

Thus, since the comparison object field takes on a different value with each entry, several approaches to high-speed lookup have been undertaken in the past. For example, high-speed radix tree and radish tree algorithms are employed for the network processing in Berkley Software Distribution (BSD) OSs, the Transmission Control Protocol/Internet Protocol (TCP/IP) implementation reference. With these types of algorithms, an entry is created that shows the existence of a branch object bit, in the location in the address field where an entry candidate first branches, in order from the most significant bit on downward. Then, based on the "0" or "1" value of the branch object bit (check object bit), the possible entry is classified according to the bit sequence that follows. Therefore, a lookup proceeds to a bit location where a branch candidate is to be branched, and branches depending upon the value found there, tracing through the tree in order until a point is found that has no branch, and then determines whether the arrived at entry satisfies the lookup conditions. However, with this type of tree based algorithm, the number of branches needed to arrive at a single entry is not the same for each entry. Depending upon the conditions, it may take only one branch to arrive at a certain entry, while for a different entry, in a worst case scenario it is possible that it may take as many repeating branches as the address length. Further, even if an attempt is made to perform the algorithm in hardware in order to make it high-speed, each step in the lookup process is dependent, so it is difficult to speed it up by means of pipeline processing or bubble processing. A Content Addressable Memory (CAM) is in use as a technique of performing high-speed hardware lookups. However, as explained above, routing information lookups have different lengths for each entry, so the CAM, with fixed length data lookup, cannot be used as is, but must be coupled with a route cache or other technique. A route cashe maintains as a list correspondence between an object address and its matching entry after a lookup is first performed, and it is easy to use the CAM and construct a lookup apparatus. However, the entries which is represented by a network address, namely a kind of address aggregate, are handled as their developed forms of separate address units, and to hold an equivalent amount of information, a much larger table size is needed. On the other hand, if the table size is restrained, the number of cases in which there is no hit in the cache will increase, so there is a problem in that to get high-speed with a route cache does not work well.

In addition, there are techniques of constructing a tree with multiple bit units, but the tree branch locations become fixed bit locations. For that reason, in an application in which every comparison object takes a different value for bit width, it is necessary to construct a table in which the address is developed in some form as in the case of the route cache. This means that one cannot escape a greatly enlarged table size. To avoid this problem, a structure that accommodates a portion in a cache like manner must be used, but this has poor efficiency, just like the route cache described above.

A "Masked Lookup Memory Circuit" (Japanese Patent Application Laid-open Nos. Hei 3-12896, Hei 7-143156, Hei 10-112728, etc.) exists that uses a structure in which a mask bit is added to the prior type CAM memory in order to set the comparison object bit separately for each entry. In this circuit, the data length, which is set independently for every entry indispensable for routing information lookup on the IP network, is included at the CAM level, but with the degree of semiconductor integration, etc., it is not always possible to ensure a capacity that will store all of the routing information.

SUMMARY OF THE INVENTION

Therefore, an object of the present invention is that by combining means for a masked lookup memory with a tree or a multistage indexed type memory table, to be able to perform lookup, not only will the problems of unbalanced lookup time and an increased table volume be eased, but even if only a small amount of masked lookup memory can be used, a lookup process possessing a large lookup table will be realized.

In order to solve the above object, a high-speed lookup method of the present invention comprises the steps of: dividing entries, which become lookup objects and have variable length comparison conditions, into a plurality of groups, taking a representative lookup key as lookup data for each of the groups, and storing mask data that sets a range for matching with a match candidate, as well as comparison object data in a masked lookup memory means so that setting can be made for each of said entries; and obtaining, from the masked lookup memory means, information corresponding to the groups that match the lookup conditions, and limiting the lookup object entries to the data within the object group.

This structure further comprises the steps of: classifying the entries, which become lookup objects, into a tree state, with nodes adopted at points where bit values are either "0" or "1", in order from the first bit; and performing a lookup for matching entries after the entries, which have been classified into the tree state, are limited to the data within the object groups.

In addition, it may further comprises the steps of: constructing a tree for all of the entries as lookup objects; selecting an intermediate node location as a virtual entry representative of the lookup group by coming upstream by a fixed number of hops from the farthest point from the tip root, out of all the leaves at the distal ends of the tree; excluding branches below the node location of the selected virtual entry and repeating the procedure; storing the selected virtual entries in the masked lookup memory means until all of the entries have been covered; determining during lookup whether the virtual entry matches the conditions by referencing the masked lookup memory means; and performing further lookups using the tree.

The above high-speed lookup method further comprises the step of, when lookup occurs within the object group, performing a lookup in a table using a table lookup offset determined by the region from where the lookup key value bit string from the lookup object entry within the group first differs, up to the longest data length. This structure, when determining the representative virtual entry from the lookup group, may further comprises the steps of: classifying the lookup object entry into a tree state with nodes adopted at points where bit values are either "0" or "1", in order from the first bit; taking branches, in which the branch bit locations are unevenly distributed, as the group and performing a lookup by the masked lookup memory means until a group that matches the conditions is found; and performing further lookups with reference to the table.

The high-speed lookup apparatus of the present invention comprises: a masked lookup memory means that divides entries, which become lookup objects and have variable length comparison conditions, into a plurality of groups, takes a representative lookup key as lookup data for each group, and stores the mask data, which sets a range for matching with a match candidate, as well as the comparison object data so that setting can be made for each of the entries; and a lookup means that obtains, from the masked lookup memory means, information corresponding to the groups that match the lookup conditions, and limits the lookup object entries to the data within the object group.

This structure further comprises a tree construction means which classifies the entries, which become lookup objects, into a tree state, with nodes adopted at points where bit values are either "0" or "1", in order from the first bit, in which the lookup means performs lookup for matching entries after the entries, which have been classified into the tree state, are limited to the data within the object groups.

In addition, the tree construction means constructs a tree for all of the lookup object entries, selects an intermediate node location as a virtual entry representative of the lookup group by coming upstream by a fixed number of hops from the farthest point from the tip root, out of all the leaves at the distal end of the tree, excludes branches below the node location of the selected virtual entry and repeats the procedure, and stores the selected virtual entry in the masked lookup memory means until all of the entries have been covered, and the lookup means determines during lookup whether the virtual entry matches the conditions by referencing the masked lookup memory means, and a further lookup is performed using the tree.

The above high-speed lookup apparatus further comprises a memory means that, when the lookup means is performing lookup within the object group, creates a lookup table within the group as a table lookup offset, from the first location where a bit string differs to the longest data length, through the lookup key value of the lookup object entry.

This structure further comprises a tree construction means that classifies the lookup object entry into a tree state with nodes adopted at points where bit values are either "0" or "1", in order from the first bit, in which, during determination of a representative virtual entry of a lookup group, the lookup means takes branches where the branch bit locations are unevenly distributed as a group, and performs a lookup by the masked lookup memory means until a group that matches the conditions is found, and performs further lookups with reference to the table.

Both the high-speed lookup method and the high-speed lookup apparatus can be applied to a router that performs forwarding of packets based on entries corresponding to routing information, in a network that provide communication conforming to an IP protocol.

In the present invention, when constructing the lookup tree, the branchpoints are registered in the masked memory means as virtual entries when the number of branches to the tip is less than a fixed value, or the common portion of the bit strings from multiple routing information entries are stored in the masked lookup memory as virtual entries. And by maintaining information on the each of the remaining entries, where the differing address fields are stored in a conventional table form as indexes, the number of lookup levels and the table size can be reduced when compared to a conventional multistage table arrangement.

By performing a primary classification of the routing lookup by the masked lookup memory in this way, the remaining lookup processing volume can be reduced.

BRIEF DESCRIPTION OF THE DRAWINGS

These objects and advantages of this invention will become more apparent and more readily appreciated from the following detailed description of the presently preferred exemplary embodiments, taken in conjunction with the accompanying drawings, of which:

FIG. 3 is a drawing showing an example structure of a routing table;

FIG. 4 is a drawing showing the correspondence of assumed IP addresses and MAC addresses in the table of FIG. 3;

FIG. 10 is a drawing showing the structure of masked lookup memory in the second embodiment;

FIG. 11 is a drawing showing the structure of a memory table in the second embodiment;

FIG. 12 is a drawing showing the structure of the memory table in the second embodiment.

DETAILED DESCRIPTION OF THE PREFERRED EMBODIMENTS

First Embodiment

Figure 1:
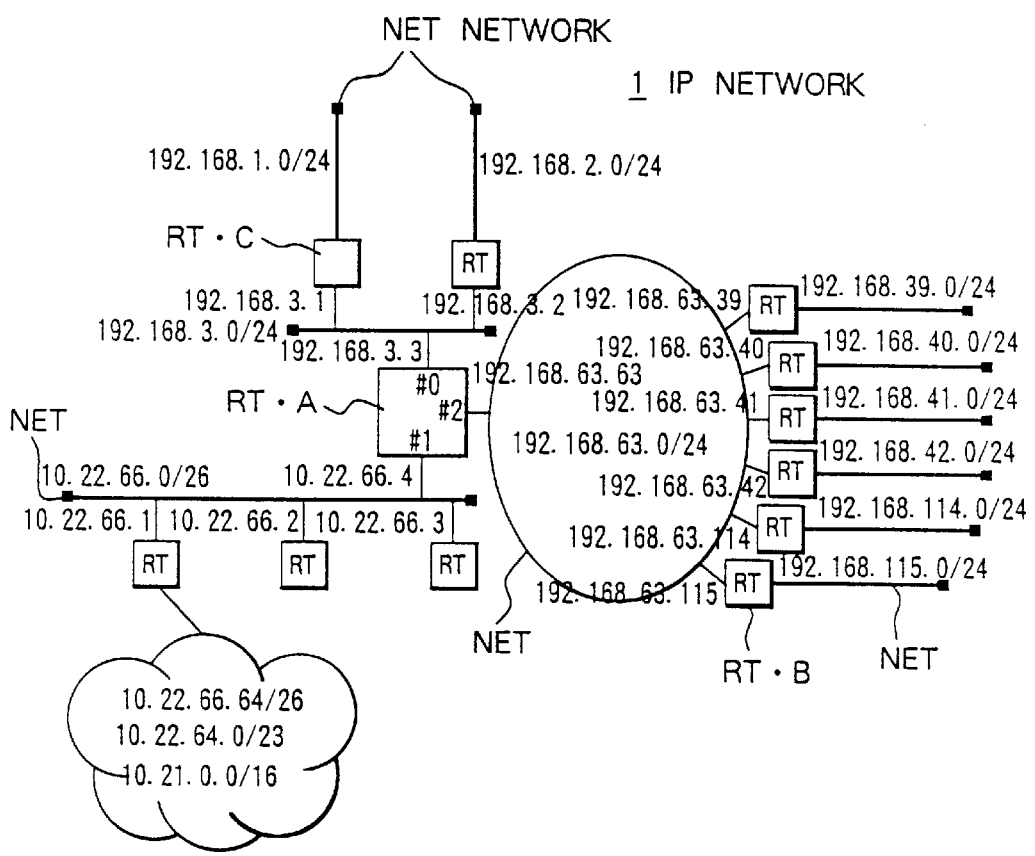
FIG. 1 is a block diagram showing the structure of an IP network in a first embodiment of the present invention.

A high-speed lookup method and a high-speed lookup apparatus according to a first embodiment of the present invention, are explained using an example of an application to a routing information lookup in an IP network router. Referring to FIG. 1 that shows IP network construction, routers denoted by a reference symbol RT relay packets between differing subnets inside IP network 1, for example, between one LAN and another LAN, or on an exclusive line, to perform the role of making possible communication between communication nodes that cannot directly send and receive packets. Each router RT has multiple interfaces, and complying with the destination address within an IP packet received from one of the interfaces, determines from which interface and where the packet should be sent in order to arrive at its destination, and relays the packet. A routing table is the table that stores information regarding where to relay the packet in accordance with its destination address, the information being required when this packet relay is carried out. Each of the routers RTs possesses a routing table. In addition, each of the routers RTs is connected between networks NETs such as LAN and WAN.

Figure 2:
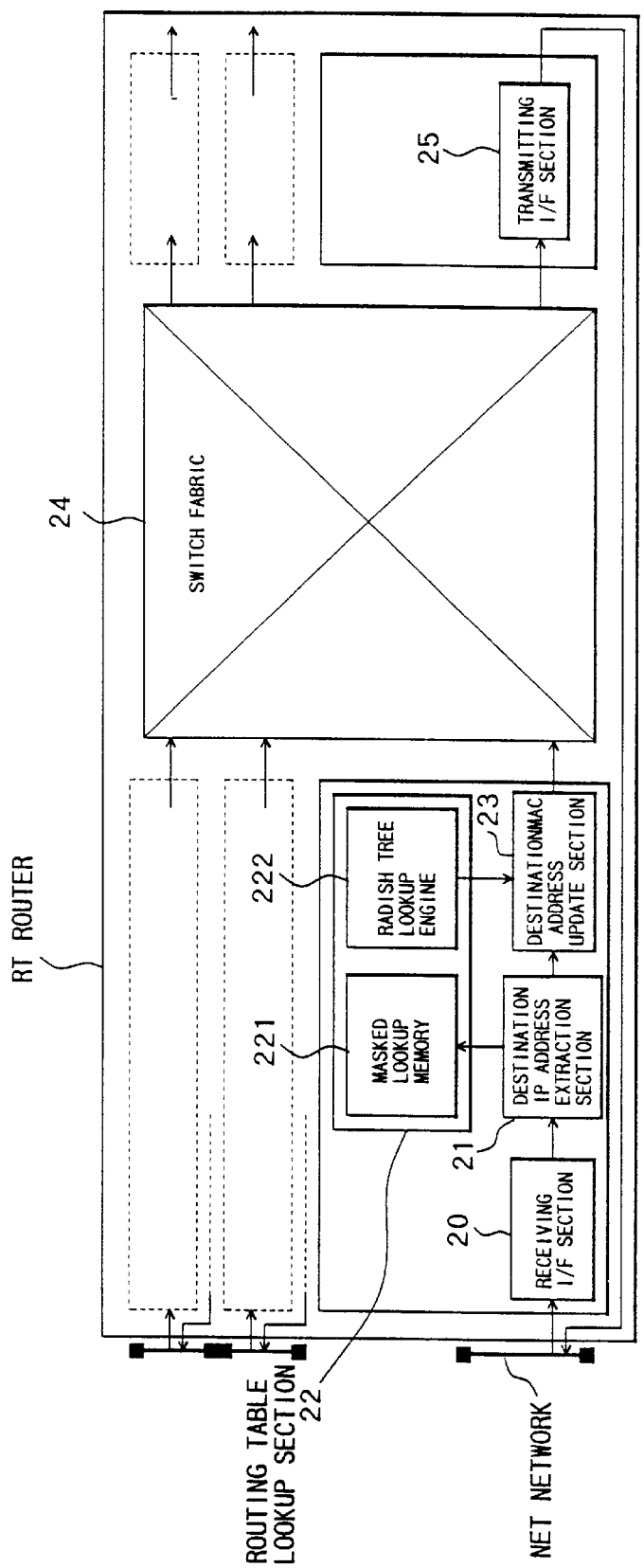
FIG. 2 is a block diagram showing the detailed structure of a router in FIG. 1.

As an example, each of the routers RTs in FIG. 1 may take the detailed structure shown in FIG. 2. Referring to FIG. 2, the router RT possesses a receiving interface (I/F) section 20 that receives a packet from the network NET (strictly speaking, from an interface section of a LAN such as Ethernet), and a destination IP address extraction section 21 which extracts destination IP address information, based on the packet to be relayed from the receiving I/F section 20, and then passes it to a routing table lookup section 22.

The routing table lookup section 22 stores routing information, checks the routing information corresponding to the destination address of the packet to be relayed, and obtains the matching outgoing interface, and through the outgoing interface, the destination MAC (Media Access Control) address of the physical address of the destination. As explained in detail later this lookup section 22 is comprised of a masked lookup memory 221. as well as a radish tree lookup engine 222. In addition, a destination MAC address update section 23, based on the routing table lookup result, overwrites the packet from the destination IP address extraction section 21 with the MAC address corresponding to the destination.

The router RT also has a switch fabric 24 which sends the packet to a transmitting interface (I/F) section 25 determined based on the routing table lookup result. This transmitting I/F section 25 sends the packet received from the switch fabric 24 to the network NET (strictly speaking, from an interface section of a LAN such as Ethernet). The router RT has multiple interfaces which correspond to the network, and builds the above circuit for each of those interfaces.

The routing table that each of the routers possesses has the IP address of the router RT that carries out the next relaying (the final destination communication node address when direct output is possible to the final destination), and information of the interface connected to that router RT, for each destination network, when outputting a packet to that destination network. That is, for the example of the IP network shown in FIG. 1, the structure of a routing table for the router RT.A is shown in FIG. 3. In addition, the correspondence between assumed IP addresses in this routing table and MAC addresses for each host network is shown in FIG. 4.

A routing table 3 in FIG. 3 shows destination networks using their addresses (the "destination network address" item in the figure) and prefix lengths of those addresses (the "prefix length" item in the figure). The routing table 3 is a table used to obtain a outgoing interface (the "outgoing interface" item in the figure) as information giving the route pointing to the interface to the destination network, and to obtain a set MAC address (the "destination address" item in the figure) as the destination when transmitting. In the example of the routing table 3, it is assumed that the router RT.A already knows the IP addresses as well as the MAC addresses of the routers (or hosts) to which it can directly transmit, and moreover, the routing table 3 has produced, for every those routers RT, separate route entries. Furthermore, in this example, there are 3 self IP addresses, set with identifiers as "local" under the outgoing interface, and as "N.A." under the MAC address in that entry.

Refer to FIG. 1, FIG. 3, and FIG. 4 together, for the case where the router RT.A transmits a packet to a router RT.B with IP address 192.168.63.115. In order to send the packet to the network in which the 192.168.63.115 address belongs, the router RT.A does a lookup in the routing table 3 to determine where to send the packet. In the routing table 3, the entries matching the destination network address (IP address) 192.168.63.115 are the entry with destination network address 192.168.63.0 and prefix length 24, and the entry with destination network address 192.168.63.115 and prefix length 32. In IP packet routing, for cases where a multiple number of routing entries match the destination address, the one with the longest prefix length is given priority by convention, so the latter entry is selected here. Based on the information stored in this entry, the router RT.A transmits this packet as destination address (destination MAC address) 0:0:c0:a1:a:9f from destination interface #2. The network connected to the router RT.A interface #2 (the LAN allocated network address 192.168.63.0/24) is notified, and the communication node holding the destination MAC address 0:0:c0:a1:9f (here, the connection node with IP address 192.168.63.115, according to the correspondence table shown in FIG. 4) receives the packet. Thus the packet arrives at the destination address.

Furthermore, for cases where the router RT.A transmits a packet destined to communication node with address 192.168.115.35, inside a network with network address 192.168.115.0/24 and located beyond the address 192.168.63.115 as seen from the router RT.A, the routing table 3 is referenced in the same way, and the result is obtained in that the entry with destination network address 192.168.115.0 and prefix length 24 corresponds to this address. Then based on the information in this entry, if the packet is given MAC address 0:0:c0:a1:a:9f and is sent from the interface #2, this packet arrives at the router RT.B, given IP address 192.168.63.115. The router RT.B performs routing processing similar to that of the router RT.A (to determine the packet relaying routing table) and transmits the packet to the network NET with the address 192.168.115.0/24. By the destination communication node receiving this packet, it arrives at the destination communication node when it receives the packet.

The above gives an example in which the router RT.A is the transmission source, but if, for example, a router RT.C given IP address 192.168.3.1 considers the router RT.A as a router on the way to the destination and the router RT.A relays a packet with a similar address, relay operations inside of the router RT.A performs similar processing. In addition, for packets of which transmission source is another node, if the router RT.A is on the route from the transmission source node to the destination and the router RT.A receives and relays the packet, similar processing is performed.

In the above examples, the routing table 3 is structured to provide the MAC address of the router for the next hop (the destination if the next hop is the final destination). Depending on the implementation, however, it is possible to have a structure in which the IP address for the next hop is obtained in the routing table 3, while the MAC address, to be actually given to the packet, is obtained from the next hop IP address of each interface at its transmission processing.

Figure 5:
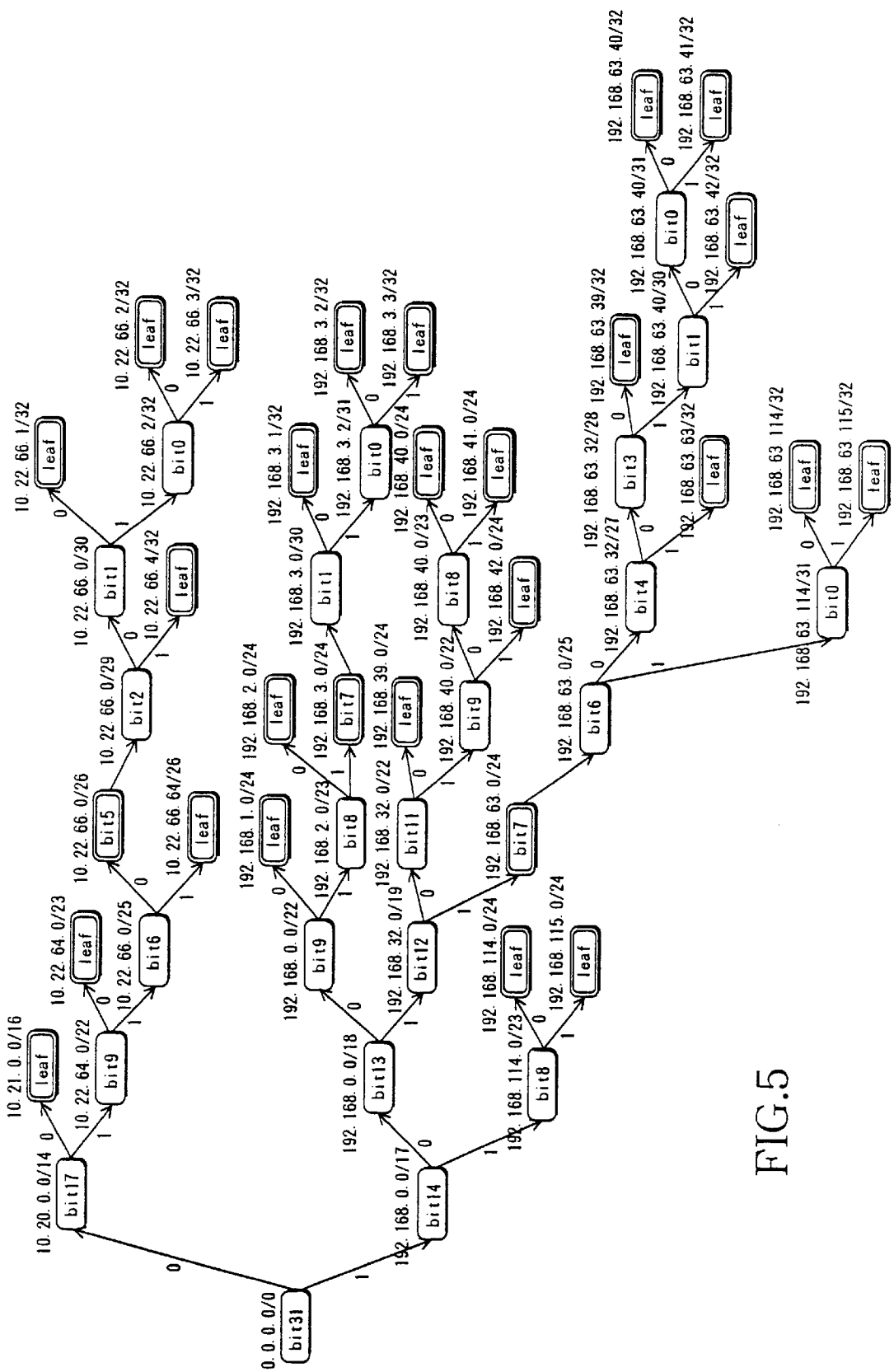
FIG. 5 is a drawing showing the structure of a radish tree corresponding to the routing table in FIG. 3.

FIG. 5 is radish tree in which the routing information shown in FIG. 3 is formed into a tree. The top branchpoint is called a root, the intermediate branch-points are called nodes, and the distal points are called leaves in the figure. Note that node is also used as a generic term for a root, a node, as well as a leaf. In the figure the pertinent bit numbers for a root and nodes are shown, and branching is based on whether the value of this bit from the lookup object value is "0" or "1". In addition, the nodes indicated by a double-circle and the leaves correspond to actual routing information (real route entries). In the figure, if the network prefix is identical to the lookup-object address when arriving at a leaf an entry is discovered. If the network prefix at the leaf does not match, then the last double-circled node, out of the nodes that have been passed through, is the matching entry, but if neither is present, then there is no corresponding entry. In this example, for the shortest path 2 branches, and for the longest 10 branches, must be passed in order to arrive at an entry, so a branch decision must at most be made 10 times in lookup using only the radish tree. The routing information is set statically in that router by the operations manager. In addition, the routing information can be obtained dynamically by exchanging information between adjacent routers while utilizing routing information exchange protocol (routing protocol). For this formation of routing information, the routing table 3 is modified when a new routing entry is added, or when an existing entry is removed. It is necessary to reconstruct the routing table and the radish tree at this time.

For changes in the routing information, if the change is an addition of a new routing entry, the addition to the tree (radish tree) is performed by the following procedure:

(1) Perform a lookup on the existing tree using routing information with the new entry (a detailed description of the lookup procedure is given later).

(2) When matches occur until a certain node is reached, and the next node (or leaf) does not match, a node is inserted in the non-matching node and in the first non-matching bit location of depending on the test object bit value, 0/1, a branch is rebuilt to either continue with the new entry, or to continue with the existing node (or leaf).

(3) If a match is reached with a leaf, and it is a subset of that leaf, entry of that leaf is changed to a node entry, and a newly added entry is connected below that node. If a match is reached with a leaf and it is not a subset, then it is a completely identical entry, so the entry is overwritten.

In addition, when an entry is deleted, the deletion from the tree (radish tree) is performed with the following procedure:

(1) Trace the tree and search with a key that is the network entry of the entry node of the object to be deleted.

(2) If the entry is a leaf, delete that leaf. Then if the preceding node is a node with no entries, delete the node as well since there is no need for branching at that point.

(3) If the entry is not a leaf, but is a intermediate node, delete the entry information only and leave the node if the tree branches at that node. If there is no branch, then delete the node as well.

Note that these procedures are the very procedures for updating the tree using the radish tree algorithms, but are merely an example.

Next, a lookup operation with a tree that corresponds to the routing table constructed with the above routing entry addition and deletion procedures, is explained. The tree shown in FIG. 5 is an example radish tree constructed from the routing table 3 shown in FIG. 3 through the above procedures. Similar to what is written above, if an example is taken where the router RT.A sends a packet to the router RT.B with IP address 192.168.63.115, in the routing table lookup operation the radish tree in FIG. 5 is searched as follows. First, looking at a node, which is the tree root, the address information held by that node contains the destination network address 192.168.63.115 (in binary, 11000000101010000011111101110011), (having the prefix length of "0", every address is matched), so there is the possibility of a candidate ahead and the lookup is continued. The value of bit 31 here shows that the candidate branches thereat, so bit 31 of the address 192.168.63.115 is checked. Since this bit is "1", the search forwards to the branch indicated by "1". The address information held by the next node is 192.168.0.0/17, still matching the destination network address 192.168.63.115. Now, at this node the branching object bit 14 value is checked for the network address 192.168.63.115, and found to be "0". Therefore the process forwards to the branch indicated by "0".

By repeating this procedure serially, bit 13 of the address 192.168.0.0/18 node is checked and branch indicated by "1" is followed, bit 12 of the 192.168.32.0/19 node is checked and branch indicated by "1" is followed, arriving at the 192.168.63.0/24 node. This node corresponds to a real route entry, and moreover matches the destination network address 192.168.63.115, so at this point a matching entry is found. However, there is still more of the tree ahead, so the lookup continues in order to find a matching candidate with a longer prefix length. Doing so leads to the address 192.168.63.0/25 node and bit 6 is checked to proceed to the branch of "1", then bit 0 is checked at the 192.168.63.114/31 node and branch indicated by 1 is followed, arriving at the 192.168.63.115/32 node (leaf). This node address matches the destination network address, and since there is nothing ahead, the entry corresponding to this node is the entry containing the routing information that must be chosen. Therefore, by sending the packet in accordance with the next hop corresponding to that entry (this routing information is not shown in FIG. 5), packet transmission or packet relaying operation is completed.

The farthest leaf from those shown in the structure of the radish tree in FIG. 5 is chosen, and by tracing upstream from there by four nodes, that node is chosen as a virtual entry. If there is a node with a real route entry further upstream of the virtual entry, by choosing a node more toward the distal end of the tree, when there is no hit, it becomes impossible to obtain the entry of the last passed-through node with a real route entry. Therefore, if such intermediate node is present, chose that as the registered virtual entry, and exclude everything downstream from that point as a virtual entry candidate. Exclude all entries downstream of the thus selected virtual entry, repeat this process serially, and when all of the farthest entries are within four nodes, lastly add the tree root to the virtual entry. The structure of a radish tree that includes the selected nodes as a result of this procedure is shown in FIG. 6, and the virtual entries, corresponding to the selected nodes, and registered in the masked lookup memory 221 (in FIG. 2) are shown in FIG. 7.

Figure 6:
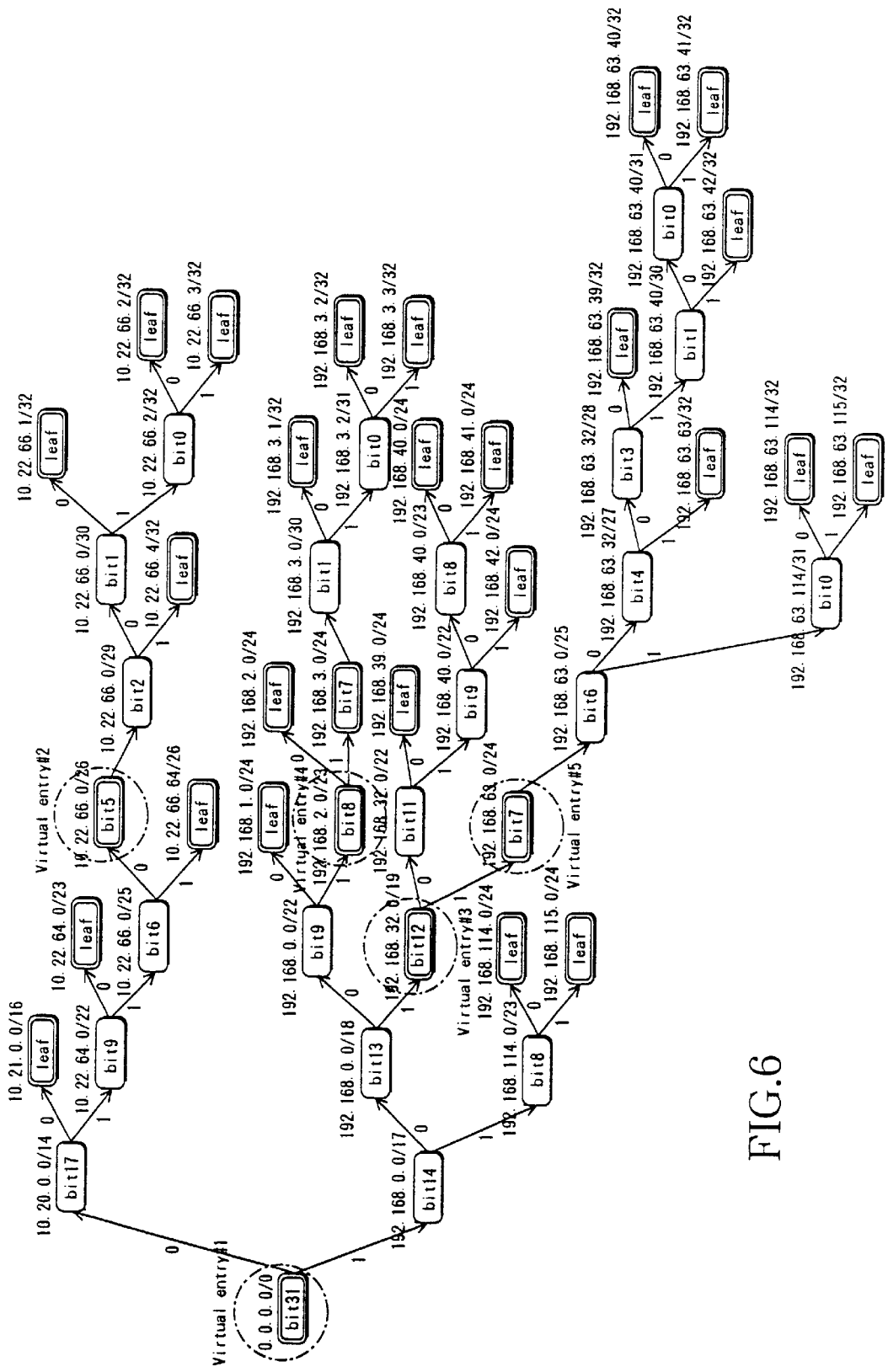
FIG. 6 is a drawing showing an example structure of a radish tree after selection of virtual entry in the first embodiment.
Figures 7, 8:
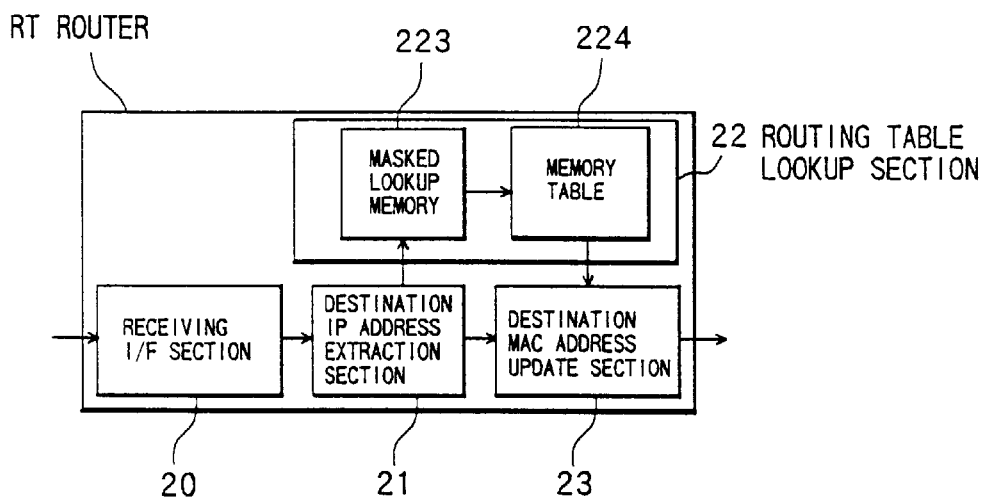
FIG. 7 is a drawing showing an example virtual entry registration to a masked lookup memory in the first embodiment.
FIG. 8 is a block diagram showing the structure of a router in a second embodiment.

The virtual entries in FIG. 7, as lookup object bits from the most significant bit to the branch bit, are stored in the masked lookup memory in order so that higher priority is given to longer prefix lengths, which must be compared upon lookup. Then, instead of searching the tree from the root, first look up the memory, find a matching entry, and based on the information corresponding to that entry position, obtain the position of the node in the radish tree shown in FIG. 6 which must be subsequently looked up, and continue the tree search. By doing this, it is possible to set a maximum of five references until each of the real route entries is reached, and the number of steps necessary for a lookup can be greatly reduced. Note that this entry selection is only an example, and any other way will work well if only the intermediate nodes (leaves or roots, depending on situations) of the tree are suitably selected, and virtual entries are selected so that the number of en route nodes between the last selected node and the leaf are reduced.

With the restriction under the existence of intermediate nodes having real route entries, the number of steps to a leaf sometimes becomes larger than the set number of steps (virtual entry node #5 in the examples of FIG. 6 and FIG. 7 corresponds to such). In this case, it is good to divide up such intermediate entry into two or more entries, and to reconstruct the route tree so that the number of steps from such intermediate node to the leaf is reduced to the set value and then to carry out the above procedure.

In addition, from the table shown in FIG. 7, the destination network address and mask value of the node chosen as a virtual entry are taken as a key, and a pointer to the node containing that node information can be obtained. It is assumed that this table will be constructed with a masked CAM. Now, the destination network address is stored as the data section of the CAM, and stored as the mask section is a value in which a certain number of bits "1" are lined up from the upper bit, the number corresponding to the number of bits in the numeric value written in the mask value, and the rest of the bits are "0" (in an arrangement that bit "1" is excluded from objects for matching decision and bit "0" is a matching object). Beginning a lookup with this example, first the destination network address of the relaying object packet is taken as a key and a lookup is performed on the masked lookup memory (221 in FIG. 2) storing the table in FIG. 7. Then the information to the virtual entry corresponding to the destination address is obtained (specifically, the virtual entry address in memory storing the tree, etc.) The lookup operation for a case where the router RT.A sends a packet to the router RT.B with address 192.168.63.115, the same example as above, is explained.

First, the destination network address 192.168.63.115 is taken as a key, and a lookup is performed on the masked lookup memory that stores the contents of FIG. 7. Doing so leads to a hit on the entry with destination network address 192.168.63.0/mask value 24. Its contents show the virtual entry #5. Then the lookup is started from te virtual entry #5 in the tree shown in FIG. 6. Therefore, the operations occurring after arriving at the 192.168.63.0/24 node in the previous example are performed below. This node corresponds to a real route entry, and moreover matches the destination network address 192.168.63.115, so a matching entry is found at this point. However, there is still more of the tree ahead, so the lookup continues in order to find a matching candidate with a longer prefix length. Doing so leads to the address 192.168.63.0/25 node and a bit 6 is checked to proceeds to the branch indicated by "1". Then bit 0 is checked at the 192.168.63.114/31 node and branch indicated by "1" is followed, arriving at the 192.168.63.115/ 32 node (leaf). This node address matches the destination network address, and since there is nothing ahead, the entry corresponding to this node is the entry containing the routing information that must be chosen. Therefore, by sending the packet in accordance with the next hop corresponding to that entry (this routing information is not shown in FIG. 6), packet transmission or packet relaying operation is completed. The lookup processing becomes higher speed in this lookup technique by the amount saved through arriving at the virtual node location in one jump when using masked lookup memory.

Second Embodiment

Next explained is a second embodiment of a high-speed lookup method and a high-speed lookup apparatus according to the present invention. As a memory table for obtaining the corresponding packet relaying destination information from an IP address (destination network address), if a table has the same volume of entries as the IP address space, the relaying destination information can be obtained with one reference of the memory, but when considering the amount of memory needed for this, this is not realistic. Then, only a portion of the bit string that forms the address is used as an internal table entry offset when referencing a table. Several such tables are prepared in a memory (RAM) table, and address sets that can be represented by the respective tables are registered in the masked lookup memory as virtual entries. In this embodiment, a router RT that realizes high-speed lookup is constructed from the routing table lookup section 22 of the router RT in FIG. 2, a masked lookup memory (CAM) 223, and a memory (RAM) table 224, as shown in FIG. 8.

Similar to the first embodiment above, an example of this lookup technique applied to the routing information in the routing table 3 shown in FIG. 3 is explained. To determination of the block extent for this type of memory table, first prepare a radish tree like the example in FIG. 9 (corresponding to FIG. 5), then search for a node where the branch object bits in the tree below a certain node are relatively dense, and register that node as a virtual entry in the masked lookup memory 223 (see FIG. 10). If there are still scattered real route entries after excluding major trees having dense branch object bit area, a virtual entry can be made covering all of them, or they can be allocated as independent entries if there is space in the lookup memory. In FIG. 10, (e) and (f) are virtual entries allocated to individual entries.

Then the route entry information included in the portion of the tree below the node selected as the virtual entry is referenced as a table form that can easily be constructed with normal memory. Information corresponding to each entry is stored in this table. The structure is as follows. A bit field ranges from the most significant bit of the branch object bits among the nodes that are included in the portion of the tree below the node chosen as a virtual entry, to the longest network prefix length bit out of the route entries in contained in those nodes. The bit field is used as an index within the memory table or as an internal table entry offset, and the contents of the routing information corresponding to that location are the actual memory contents. The least significant bit of the longest network prefix is included in the bit extent used as the index, because if that bit is not included in the determination object, there may be cases where entries are included that do not correspond to the entry in question.

In FIG. 11 and FIG. 12 is an example of the contents of the memory table 224 referred by the virtual entries (a) to (f), respectively, of the masked lookup memory 223 shown in FIG. 10. When constructing this type of table, actual entries do not have network prefix lengths that are all the same. Therefore, if the bit extent used as the offset address is determined in accordance with the longest prefix length entry, it is necessary to clearly show which bits must be disregarded for entries with shorter prefix lengths. However, the internal table entry offset location when the disregarded bit value is "0", and the internal table entry offset location when it is "1", have the same contents registered, so for all intents and purposes, contents which are not dependent on that bit can be obtained. In FIG. 11, items beyond entry offset 64 in table (c) correspond to this. In addition, since table (a) exists with a higher reference priority than table (c), the position of entry offset 63 in table (c) is actually never referenced (in this example the priority ranking gives the storage order to the masked lookup memory shown in FIG. 10). By thus developing in the table form, entries for address sets with no routing information are actually created.

For a destination that can be directly transmitted to but having an entry without routing information, in a network including an IP network and a LAN, only the MAC address of the destination IP address is unknown. For this type of case an address resolution protocol (ARP) is used to investigate the corresponding MAC address. This ARP protocol has been established as standard Internet protocol RFC826 (ftp://ftp.is i.edu/in-notes/rfc826.txt) by the Internet Engineering Task Force (IETF). In this embodiment, once operation proceeds to the point that tells such procedure is needed, remaining only matter is implement dependent of a system using this lookup mechanism, and therefore, this type of entry is denoted as "incomplete" in FIG. 11 and FIG. 12. On the other hand, for cases where there is truly no route, and there is no way to determine the packet destination, information indicating "N.A." (invalid) is stored in the entry. The process for times when the search ends up in such entry involves treating it the same as when a matching entry in the masked lookup memory 223 cannot be found, and processing is performed in accordance with "no routing information" as determined by the IP protocol. The section that executes this process, just as the section that executes the ARP protocols, should be put into operation externally to the lookup apparatus of this application.

In addition, consider another method for individually determining the entry set that holds the memory table 224. For a network prefix that can transmit from its own interface directly to the final destination, entries are necessary for each destination host. Therefore, tables may be created for each of the network prefixes to which the interface belongs, so that the section excluding the network prefix from the IP address (host address section) is allocated as an offset to search the table. It is possible that this table, as an implementation in a network transmission process, can be held as a table conforming to a separate ARP protocol when implementation is performed. Note that if the table that gives the route below that entry becomes too large when allocating a virtual entry, by dividing it into multiple address blocks, defining a virtual entry for each address block, and then registering them in the masked lookup memory, too large size for one table can be avoided. In addition, instead of placing information in the masked lookup memory leading directly to the final table, information may be registered leading to an intermediate table. This is a structure for going to one table through another table, and it can handle cases where the scale becomes too large even after this block division.

In addition, in the structure of the tables in FIG. 10, FIG. 11, and FIG. 12, even for cases of allocating the masked lookup memory 223 entries for the independent real route entries, the memory table 224 is referenced at least once. However, a form may be employed in which real routing information is substituted for a pointer to the memory table 224 in the information associated with corresponding entry in the lookup memory 223. In this case, it is necessary to hold flag information as well in order to distinguish whether a further table reference is needed, or whether routing information is inside as is.

Figure 9:
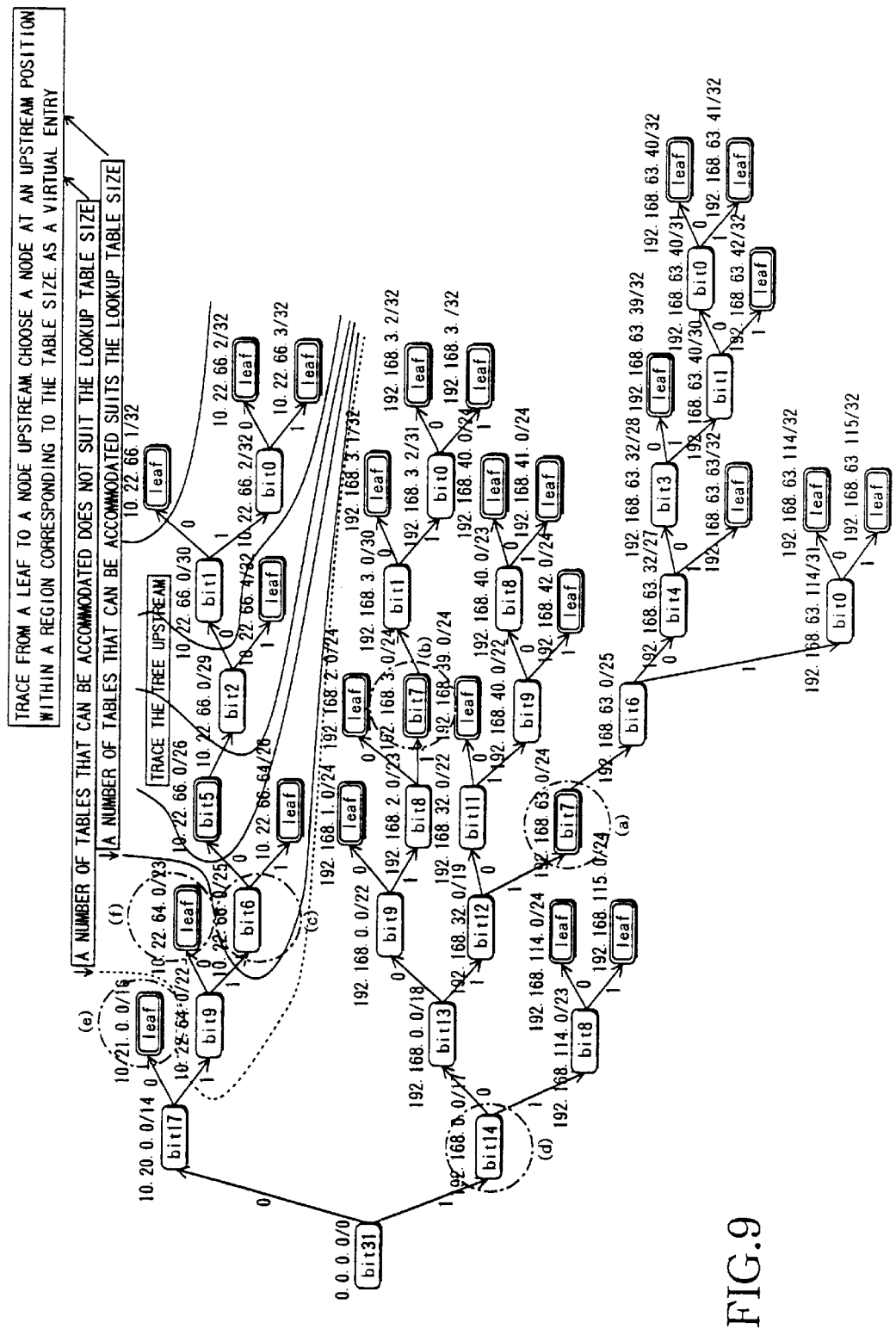
FIG. 9 is a diagram showing a radish tree in the second embodiment, where a memory reference point is selected.

The tree (radish tree) of FIG. 5 is constructed from the routing table 3 of FIG. 3. The state where the memory reference points (a), (b), . . ., (f), are chosen by tracing the tree upstream from each leaf while paying attention to areas in which the bit numbers, the branch conditions, are concentrated, is shown in FIG. 9; in short, a detailed method for selecting the virtual nodes. Regarding the memory table data width when making the memory table, or in short, where to delineate the area in which branch object bits are concentrated, in general it depends on the volume of memory that is used for the memory table. A synchronous type SRAM is effective as a memory device to use for this type of memory table because it is high-speed and can be readily set synchronously. Synchronous type SRAMs are often used as external cache memory for present day microprocessors, and it is relatively easy to acquire a 4 Mbit memory chip, containing 64 bit width×64 k words, for example. With this kind of memory, 256 tables with 256 entries each can be stored. For example, if the number of entries in the masked lookup memory (CAM memory) is 256, at most there will be 256 memory tables, so even when storing everything in one memory chip, an average memory table size can be standardized to 256 entries. Namely, an extent may be chosen when constructing the tree of within eight continuous branch object bits. Note that when using in a network where a large amount of routing information is necessary this memory may be constructed from several memory chips. By thereby increasing the volume of one memory table, an even greater amount of routing information can be stored for the same number of entries to the CAM memory. A normal memory is easy to increase the volume by using a multiple chip structure, unlike the CAM memory, so this method is effective.

An example procedure of setting method for the tree extent to be formed into the memory table is as follows:

(1) Trace upstream from each leaf node by node.

(2) When advancing upstream by one node, take the function relating the reference bit extent until that point, and the amount of routing information that can exist below that node, as an evaluation function. Repeat this upward tracing process over and over until the value of this evaluation function falls below a certain value, or until the reference bit extent exceeds a set value (for example, the number of memory input address bits).

(3) The evaluation function in step (2) may be simple, such as "the ratio of the necessary table size for that bit width to the number of routing entries that can be accommodated," or the minimum number of stored entries corresponding to the bit width may be maintained in advance in table form.

(4) For the leaves which are not accommodated in the memory table, the above steps (1) to (3), are repeated until they are processed at least one time.

(5) Entries that could not be covered are registered separately one after the other in the CAM memory as single entry.

Strictly, since the number of memory tables must be less that the number of CAM memory entries, cases exist where a sufficient volume of CAM memory cannot be secured, or where all routes cannot be stored due to a limited memory table volume. Basically, it is necessary to set "the number of CAM entries/memory volume" so that this condition does not occur. However, for packets that hold destinations which become mishits with the CAM memory, although it is possible to raise the adaptability related to overflow with software processing to lookup the route, and relay, etc., a mishit is an invitation to a large major drop in processing performance. In order to avoid this, an optimization process such as storing first routing information with a high frequency of mishits in the memory table, or replacing the CAM memory between entries used individually, etc., may be used.

The sections marked with reference symbols (a) to (f) in FIG. 9 are nodes below which a lookup is performed using the memory table (RAM table) 224. In addition, regarding the lookup through nodes (a) to (f), these nodes are registered as virtual entries in the masked lookup memory 223 table shown in FIG. 10. This lookup table, with the destination network address and mask value of the node chosen as the virtual entry are taken as a key, is a table for obtaining information showing the RAM table for conducting a lookup below that virtual entry, as well as the bit field that must be used as an index when performing the lookup. It is assumed that this table will be constructed with a masked CAM. Here the destination network address is stored as the CAM memory data section, and the mask value is stored in the CAM memory mask section.

In addition, the RAM table 224 has a structure like that of FIG. 11 and FIG. 12. The six tables (a) to (f) here correspond to the points (a) to (f), respectively, in FIG. 9 chosen as virtual nodes. The respective tables each hold only the number of entries which can be expressed through a bit field that has an extent from the object bit location to be investigated in the virtual node, to the mask bit location of the most distant leaf. The interface to which a transfer must be made and which is used as a routing result, and the interface address (MAC address) is inside each entry.

Figure 13:
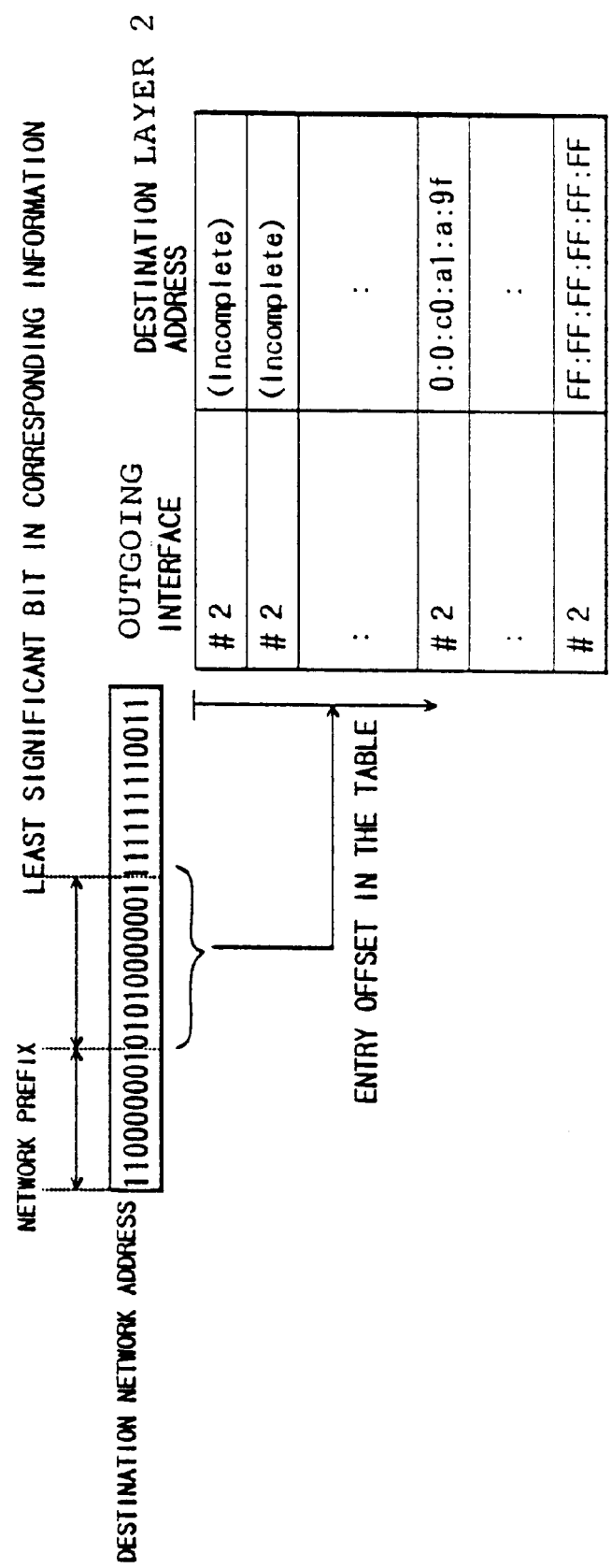
FIG. 13 is a drawing that explains the memory table references shown in FIG. 11 and FIG. 12.

The bit field used when referencing the table is placed in the table of FIG. 10 to provide for easy decisions. In short, with respect to the value which excludes the network address section of the corresponding virtual entry from the destination network address, the destination address bit position displayed by the "least significant bit" field, from the corresponding information obtained based on the table of FIG. 8 is seen as the least significant bit, and the least significant bit value is used as the entry location when referencing the corresponding table (refer to FIG. 13).

The entries stored in each of the tables are treated as if they all have the same prefix length, so of the real routing entries in the tree below the virtual node corresponding to the table, the entries with a short prefix length are expressed using a multiple number of entries within the table for each of the short prefix entry. The entry offsets 64 to 127 in table (c) of FIG. 11 are an example of such. Note that FIG. 11 and FIG. 12 can have a structure in which the values displayed as "table length" may be treated in the form of a "bit width" offset (for example, place "7" as a substitute for "128"). It is possible that this will simplify the exclusion process of the network address section, above.

Beginning a lookup with this example, first perform a lookup, while taking as the key the destination network address of a relay object packets with the masked lookup memory 223 which stores the table of FIG. 10. Then the information leading to the RAM table 224 corresponding to the virtual entry that fits to the destination network address is obtained (specifically, the virtual entry address in memory storing the tree, etc.)

The lookup operation for a case where the router RT.A sends a packet to the router RT.B with address 192.168.63.115, the same as above, is explained. First, the destination network address 192.168.63.115 is taken as a key, and a lookup is performed on the masked lookup memory 223 that stores the contents of FIG. 10. Doing so leads to a hit on the entry with a destination network address of 192.168.63.0 and a mask value of 0xFFFFFF00. The contents show virtual entry (a) as a result. Then the table (a) in FIG. 11 is referenced next.

The least significant bit obtained when FIG. 10 is referenced is bit 0. Therefore, the value 0.0.0.115 (in binary, 00000000000000000000000001110011), obtained by excluding the virtual entry (c) network address section 192.168.63.0/24 from the destination network address 192.168.63.115 (11000000101010000011111101110011), is right shifted by "0" bit, in other words the 115th entry, is the entry that stores the desired route. It may be the value 0.0.0.115 obtained when an AND operation is performed with every bit of the mask value 0xFFFFFF00 inverted.

Destination information is obtained here as the corresponding routing information from table (a). The destination information tells that the outgoing interface is #2 and the destination address (MAC address) is 0:0:c0:a1:a:9f. It is possible to make the lookup process high-speed by performing this lookup, referencing the masked lookup memory 223 and accessing the memory (RAM) table 224, a total of two reference operations to perform to get the objective route information.

Modification Examples

An example of how the present invention, a high-speed lookup method and a high-speed lookup apparatus, is applied to the relaying processing of an IP packet is explained above. However, as another applicable domain, it can be applied to processes that obtain information on affiliated groups from some ID values, etc. For example, in cell interrupt processing or cell reception processing for the asynchronous transfer mode (ATM) communications, identification of an active connection is made through identifiers called VPI and VCI. Therefore, in a cell relay device or a cell reception device, when referencing information on where to relay the cell or whether to accumulate it in the internal communication buffer, it is necessary to take these VPI and VCI as keys to perform a lookup on a management table.

In a structure storing all of these entries in a masked lookup memory (CAM memory), for the case of an ATM-UNI (User Network Interface), VPI has an eight bit address length, and VCI has a 16 bit address length. Therefore the number of entries necessary in the CAM memory is as many as the number of active connections. However, it is difficult to make CAM memory large capacity, so not many connections can be processed.

By using the high-speed lookup technique of the present invention stated above, namely performing a lookup with a CAM memory to the middle of a radish tree in the first technique, and obtaining final entry information from a memory table (RAM table) after referencing a CAM memory in the second technique, it is possible to accommodate many entries in a small volume of CAM memory. It is possible to balance between high-speed lookup and realization cost.

It is sufficient for an ATM connection management table to provide only full match, differing from IP routing information, however it is possible to apply lookup using a radish tree. Therefore create a radish tree the same way as for the above IP routing table (in this example it is not necessary to consider the prefix length), and allocate the virtual entries. Then it is possible to perform lookup from there on with a radish tree or a RAM table. In addition, it is possible to employ a similar technique where a prefix length is assumed to the VPI, if a lookup for a full match to the VPI and VCI values is not performed and, for example, ones having a specific VPI value are, irrespective of their VC values, are to be treated as the same (a case where processing on VP basis and on VC basis are performed in a unified manner). Further, for cases in which it is possible to process with the same management information a multiple number of VCs, by masking a multiple number of the lower order bits, instead of full matching, the entries may be reduced.

As explained above, according to the present invention, with a lookup using an entry search by a masked lookup memory and a tree, or a memory table, the lookup of entries, having variable length comparison conditions for each entry and which cannot all be independently stored by a masked lookup memory alone, can be performed at higher speed than that of an lookup using solely tree or memory table.

If this lookup technique is applied to the determination of an IP router packet relaying destination, for example, the determination of the destination process can be done at a high-speed.

Although only a few embodiments of this invention have been described in detail above, those skilled in the art will readily appreciate that many modifications are possible in the preferred embodiments without departing from the novel teachings and advantages of this invention.

Accordingly, all such modifications are intended to be included within the scope of this invention as defined by the following claims.

What is claimed is:

1. A high-speed lookup method comprising the steps of:
dividing entries, which become lookup objects and have variable length comparison conditions, into a plurality of groups, taking a representative lookup key as lookup data for each of the groups, and storing associated mask data that sets a range for matching with a match candidate, as well as associated comparison object data in a masked lookup memory means as an associative memory including a content addressable memory so that setting can be made for each of the entries; and
obtaining, as content data from said masked lookup memory means, information corresponding to each group that is used to pinpoint a start point for further lookup and matches each of a plurality of lookup conditions, and limiting said lookup object entries to the data within the object group.

2. A high-speed lookup method as claimed in claim 1, further comprising the steps of:
classifying said entries, which become lookup objects, into a tree state, with nodes adopted at points where bit values are either "0" or "1", in order from the first bit; and
performing a lookup for matching entries after said entries, which have been classified into said tree state, are limited to the data within said object groups.

3. A high-speed lookup method as claimed in claim 2, further comprising the steps of:
constructing a tree for all of said entries as lookup objects;
selecting an intermediate node location as a virtual entry representative of the lookup group by coming upstream by a fixed number of hops from the farthest point from the tip root, out of all the leaves at the distal ends of said tree;
excluding branches below the node location of the selected virtual entry and repeating the procedure;
storing the selected virtual entries in said masked lookup memory means until all of said entries have been covered;
determining during lookup whether said virtual entry matches the conditions by referencing said masked lookup memory means; and
performing further lookups using said tree.

4. A high-speed lookup method as claimed in claim 1, further comprising the step of, when lookup occurs within said object group, performing a lookup in a table using a table lookup offset determined by the region from where the lookup key value bit string from said lookup object entry within said group first differs, up to the longest data length.

5. A high-speed lookup method as claimed in claim 4, further comprising the steps of:
when determining said representative virtual entry from said lookup group, classifying said lookup object entry into a tree state with nodes adopted at points where bit values are either "0" or "1", in order from the first bit;
taking branches, in which the branch bit locations are unevenly distributed, as said group and performing a lookup by said masked lookup memory means until a group that matches the conditions is found; and
performing further lookups with reference to said table.

6. A high-speed lookup method as claimed in claim 1, wherein said method is applied to a router that performs forwarding of a packet based on an entry corresponding to routing information, in a network that provides communication conforming to an IP protocol.

7. A high-speed lookup apparatus comprising:
a masked lookup memory means as an associative memory including a content addressable memory that divides entries, which become lookup objects and have variable length comparison conditions, into a plurality of groups, takes a representative lookup key as lookup data for each group, and stores associated mask data, which sets a range for matching with a match candidate, as well as associated comparison object data so that setting can be made for each of said entries; and
a lookup means that obtains, as content data from said masked lookup memory means, information corresponding to each group that is used to pinpoint a start point for further lookup and matches each of a plurality of lookup conditions, and limits said lookup object entries to the data within the object group.

8. A high-speed lookup apparatus as claimed in claim 7, further comprising a tree construction means which classifies said entries, which become lookup objects, into a tree state, with nodes adopted at points where bit values are either "0" or "1", in order from the first bit, wherein
said lookup means performs lookup for matching entries after said entries, which have been classified into said tree state, are limited to the data within said object groups.

9. A high-speed lookup apparatus as claimed in claim 8, wherein:
said tree construction means constructs a tree for all of said lookup object entries, selects an intermediate node location as a virtual entry representative of the lookup group by coming upstream by a fixed number of hops from the farthest point from the tip root, out of all the leaves at the distal end of said tree, excludes branches below the node location of the selected virtual entry and repeats the procedure, and stores said selected virtual entry in said masked lookup memory means until all of the entries have been covered; and said lookup means determines during lookup whether said virtual entry matches the conditions by referencing said masked lookup memory means, and a further lookup is performed using said tree.

10. A high-speed lookup apparatus as claimed in claim 7, further comprising a memory means that, when said lookup means is performing lookup within said object group, creates a lookup table within said group as a table lookup offset, from the first location where a bit string differs to the longest data length, through the lookup key value of said lookup object entry.

11. A high-speed lookup apparatus as claimed in claim 10, further comprising a tree construction means that classifies said lookup object entry into a tree state with nodes adopted at points where bit values are either "0" or "1", in order from the first bit, wherein during determination of a representative virtual entry of a lookup group, said lookup means takes branches in which the branch bit locations are unevenly distributed as a group, and performs a lookup by said masked lookup memory means until a group that matches the conditions is found, and performs further lookups with reference to said table.

12. A high-speed lookup apparatus as claimed in claim 7, wherein said apparatus is applied to a router that performs forwarding of a packet based on an entry corresponding to routing information, in a network that provides communication conforming to an IP protocol.

13. A high-speed lookup method comprising the steps of:

dividing entries, which become lookup objects and have variable length comparison conditions, into a plurality of groups each identified by a virtual node position in a radish tree;

storing a representative lookup key, an associated mask value and the identified virtual node for each of the plurality of groups in a content addressable, masked lookup memory;

selecting an identified virtual node on the basis of matching a stored lookup key; and performing a limited lookup in the radish tree beginning at the selected virtual node.

14. A high-speed lookup apparatus comprising:

a content addressable, masked lookup memory that divides entries, which become lookup keys and have variable length comparison conditions, into a plurality of groups each identified by a lookup key, an associated mask value and a virtual node; and a radish tree lookup engine for performing a lookup in a radish tree that begins at a virtual node corresponding to a selected lookup key, such that the lookup is limited to radish tree entries for the associated group.

* * * * *